Jan. 16, 1968    D. A. WHEELER    3,363,882

CONTROLLABLE SHEAR CONTINUOUS MIXER

Filed Feb. 17, 1967    2 Sheets-Sheet 1

INVENTOR.
DENNIS A. WHEELER
BY
Learman, Learman & McCulloch

Jan. 16, 1968  D. A. WHEELER  3,363,882
CONTROLLABLE SHEAR CONTINUOUS MIXER
Filed Feb. 17, 1967  2 Sheets-Sheet 2

INVENTOR.
DENNIS A. WHEELER
BY
Learman, Learman & McCulloch

United States Patent Office 3,363,882
Patented Jan. 16, 1968

3,363,882
CONTROLLABLE SHEAR CONTINUOUS MIXER
Dennis A. Wheeler, Saginaw, Mich., assignor to Baker Perkins Inc., Saginaw, Mich., a corporation of New York
Filed Feb. 17, 1967, Ser. No. 616,929
10 Claims. (Cl. 259—5)

ABSTRACT OF THE DISCLOSURE

A continuous mixer employing a mixing shaft with mixing elements thereon in a material processing chamber between an inlet and an outlet, and a separate material advancing shaft upstream of the mixing elements mounting the mixing shaft in a manner to provide for orbital rotation of the mixing shaft with the advancing shaft and at the same time for rotation of the mixing shaft about its own axis.

Background of the invention

Prior art continuous mixers are well illustrated in the United States Zona Patent No. 2,485,854, wherein the advancing feed screw and the mixing agitators are mounted on the same shaft and are rotated at the same rate of speed and in the same direction of rotation. In such mixers the screw speed, together with the size of the container discharge opening, determines the operating pressure within the mixing chamber, but the mixing action is also directly related to the advancing screw speed and it is not possible to independently vary the mixing action without at the same time varying the flow rate within the mixing chamber. The novel mixer which will be described has separate advancing screw and mixing shaft portions and permits feed rate, mixing action and operating pressures to be controlled and varied relatively as desired, so that a wide variety of materials may be processed under flexible and controllable conditions as desired. Accordingly, the device of the instant invention may be effectively used in mixing, shredding, heat transfer, devolatilizing, pressure leaching and chemical reaction processes, with great versatility and with a mixing action not previously achieved.

One of the prime objects of the invention is to provide a mixer in which the mixing shaft not only rotates about its own axis but at the same time rotates orbitally with an advancing shaft to achieve a mixing action which effects the simultaneous smearing and rolling of the material. By independently controlling the speed of the mixing shaft the shear on the product between the mixing agitators and chamber wall can be controlled and by mounting the mixer shaft eccentrically complete displacement mixing is obtained.

Other objects and advantages of the invention will be pointed out specifically or will become apparent from the following description when it is considered in conjunction with the appended claims and the accompanying drawings, in which:

General description of the mixing machine

Figure 1:
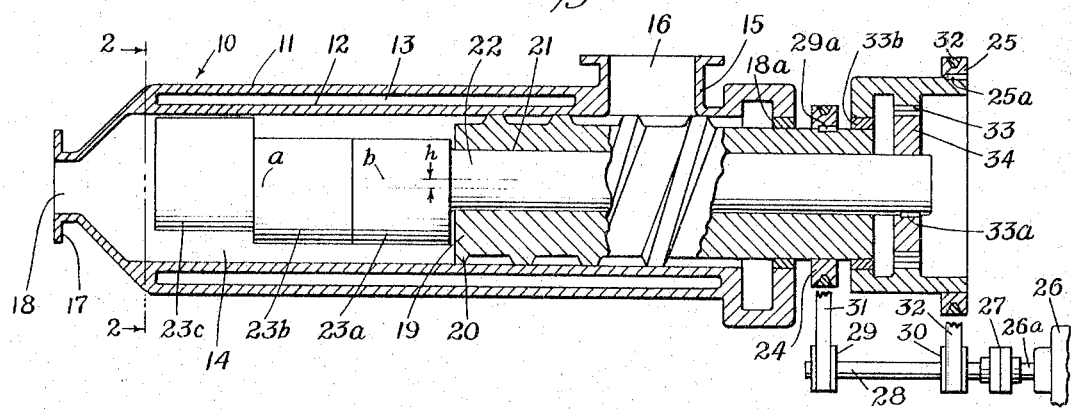
FIGURE 1 is a partly sectional side elevational view of a mixer constructed in accordance with the invention.
Figure 2:
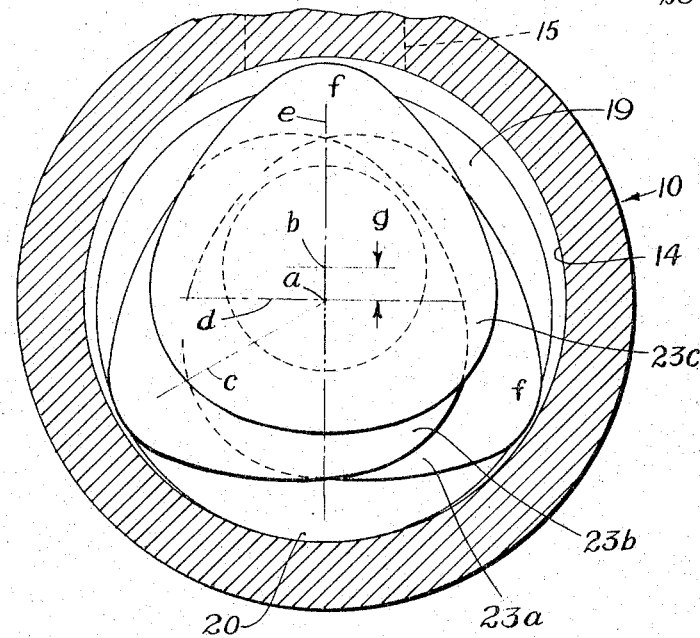
FIGURE 2 is an enlarged, transverse sectional view taken on the line 2—2 of FIGURE 1.

Referring now more particularly to the accompanying drawings and, in the first instance, to FIGURES 1 and 2 thereof wherein I have shown a jacketed mixer barrel generally designated 10, spaced apart, concentric inner and outer cylindrical barrel walls 11 and 12 define an annular jacket 13 and the wall 12 defines a tubular mixing or processing chamber 14. At one end of the barrel 10 an inlet fitting 15 having an inlet opening 16 for chamber 14 is provided, and at the opposite end an outlet fitting 17 provides an axial outlet opening 18 for the chamber 14.

Mounted concentrically within chamber 14 with respect to the center line or axis $a$ thereof in bearings 18$a$ fixed to housing 10 is an advancing shaft member 19 having forwarding screw flights 20 thereon pitched to forward material in the chamber 14 toward the exit opening 18 when the shaft 19 is revolved in a particular direction, such as counterclockwise in FIGURE 2. As FIGURE 1 clearly indicates, the advancing shaft 19 is eccentrically bored as at 21 to receive a mixing shaft 22 which is revolvable about the axis $b$ of the bore 21. At 120° angularly offset intervals with respect to a datum line such as $c$ (see FIGURE 2), mixing paddles or lobes 23$a$–23$c$ are fixed on the mixer shaft 22. As FIGURE 2 indicates, the paddles or lobes have minor axes $d$ and major axes $e$, the minor axes having a center bisected by the major axis $e$, but the major axis $e$ being divided into unequal parts by the minor axis $d$ in each instance to provide a protruding lobe portion $f$ which is offset from the axis of rotation $a$ by substantially the distance $g$. The distance $g$ is equal to the distance $h$ between axes $a$ and $b$.

Provided on the one end of advancing shaft 19 is a pulley 24 and provided to drive the rear end of shaft 22 is a pulley 25, both of which may be driven by a single electric motor 26. The pulley 24 is removably keyed to the shaft 19 as at 29$a$ so that it may be readily changed for a pulley of greater or lesser diameter as desired, or conventional, spring biased, expandable diameter pulleys may be employed in place of either pulley 24 or 25 and may also be considered to comprise means by which the relative speeds of shafts 19 and 22 may be varied. The motor drive shaft 26$a$ is shown as coupled as at 27 to a drive shaft 28 having a pair of drive pulleys 29 and 30 mounted thereon. A belt 31 is trained around pulleys 29 and 24 to drive advancing shaft 19, and a belt 32 is trained around pulleys 30 and 25 to drive mixing shaft 22 via an internal ring gear 33 in mesh with a spur gear 34 fixed on the shaft 22. The gear 34 is removably keyed to shaft 22 as with a key 33$a$, while pulley 25 which is keyed to gear 33 as at 25$a$ is journaled by a bearing 33$b$. Both pulleys 24 and 25 may be changed for drive members of appropriately larger or smaller diameter.

The operation of the machine

In operation, both shafts 19 and 22, as shown in FIGURES 1 and 2, will be rotated in the same direction (counterclockwise in FIGURE 2) but at different speeds, and because mixer shaft 22 both orbits about the axis $a$ and simultaneously revolves about its own axis $b$, a unique and highly advantageous mixing or kneading action is obtained. The action obtained may be compared with that of a pencil which is being slid bodily across a surface at the same time it is being rotated about its own axis. This is similar to the action which the paddle sections 23$a$–23$c$ achieve with respect to the surface of wall 12 as the sections $f$ move around the inner peripheral surface thereof. The eccentric lobe portions $f$ wipe the material upon wall 12 at the same time that they roll out the material on the wall 12, due to their orbital movement about axis $b$. A better shearing action is obtained in this way, with more pressure generation which disturbs the material in a more effective way, and there is a more efficient working of the material on the walls and a better resulting dispersion of the material as a result.

Because the mixing shaft 22 is eccentrically mounted by the separate advancing screw 19, the shearing of the product between the paddles 23a–23c and barrel wall 12 can be controlled by independently controlling the speed of the shaft 22 through choice of a desired size pulley 25. Complete displacement mixing occurs and, of course, the configuration of the mixing lobes or paddles 23a–23c may be varied as desired to provide the mixing shear desired. Erdmenger's United States Patent No. 3,122,356, for example, shows another paddle configuration which may be utilized to provide good displacement mixing and minimum shear characteristics, if this is what is desired in a particular process.

While, in FIGURES 1 and 2, I have shown shafts 19 and 22, which are revolved in the same direction, it is to be understood that a conventional pinion gear could be intermeshed between the gears 34 and 35 to provide a mixer in which the shaft 22 is rotated in a direction opposite to the direction of rotation of shaft 19, and it should be understood that this form of the invention is expected to be useful for certain processes.

Figure 3:
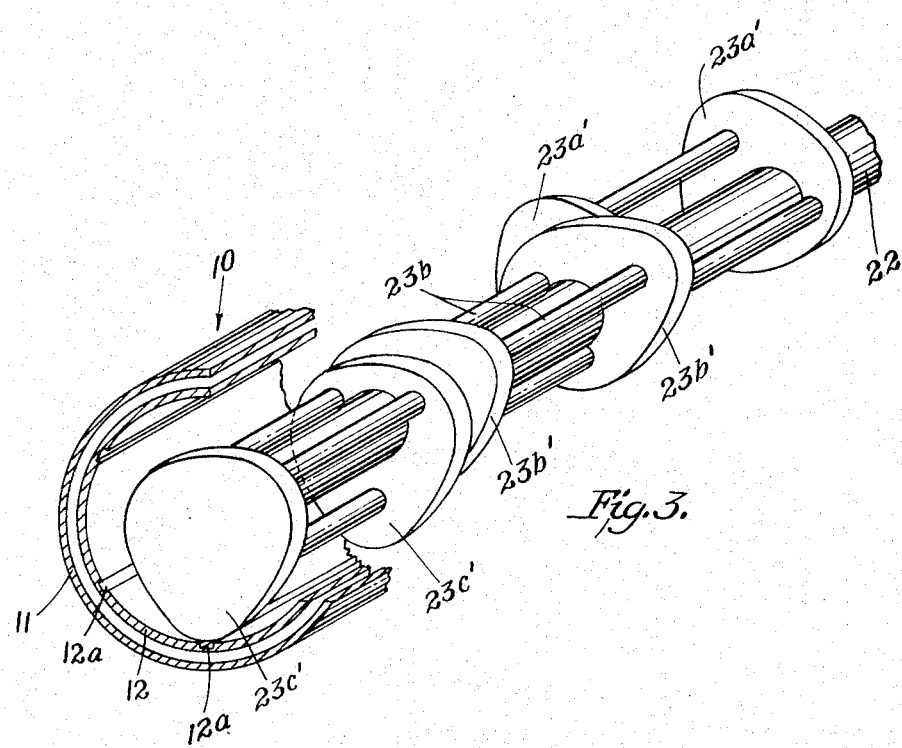
FIGURE 3 is a perspective view of a novel form of paddle which may be employed.

In FIGURE 3 an embodiment of the invention is illustrated in which each mixing paddle is shown to comprise a pair of lobes 23a', 23b', and 23c', connected by rods 23b, and the barrel 12 is shown as grooved at circumferential intervals, as at 12a. The rods 23b provide a whipping action and aeration of the product being mixed, and the grooves 12a function to shred the material. Except for the construction of the paddle sections, which are similarly arranged in 120° angular relation, the construction of the mixer fragmentarily depicted in FIGURE 3 may be considered to be identical with the mixer shown in FIGURES 1 and 2.

Figure 4:
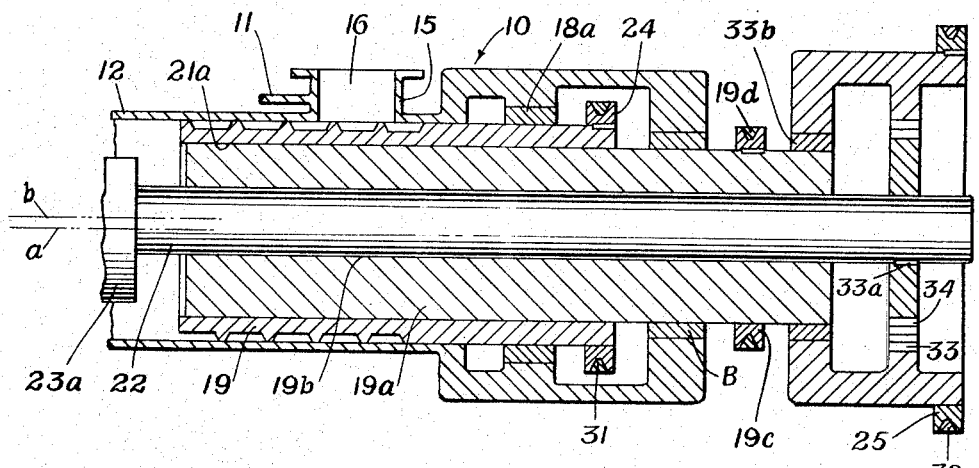
FIGURE 4 is a fragmentary, side elevational view illustrating a further embodiment of the invention.

In FIGURE 4 I have shown still another embodiment of the invention in which the mixing and shearing action obtained are isolated from the feeding or advancing of the material in the sense that the orbiting speed of the mixer shaft is no longer controlled by the rotation of the feed screw. In this embodiment of the invention, I have used identical numerals to identify identical parts and, except for the parts to be mentioned, it may be considered that the construction of this embodiment is exactly the same as the construction depicted in FIGURES 1 and 2. In FIGURE 4 the bore 21a in the advancing screw 19 is concentric with the axis $a$, and a sleeve 19a having an eccentric bore 19b therein is rotatably supported in bearings B and mounts the mixer shaft 22, the axes of sleeve 19a also being identified as the axis $b$ offset from the axis $a$ by the distance $h$ or $g$. The sleeve 19a, which for purposes of the claims may be considered to be a part of either the advancing screw shaft 19 or the mixer shaft 22, has a pulley 19c mounted thereon, driven by a belt 19d. Each of the belts 31, 19d and 32 are separately driven by separate variable speed, electric motors at different speeds in accordance with the shearing action and displacement mixing desired.

In the mixing and massing of heat sensitive materials such as rigid polyvinyl chloride plastic, conventional mixers have a very limited capacity range. Frequently, as the feed screw and agitator shaft speeds are increased to increase the capacity of the device, the associated mixing or shear action is also increased but at a faster rate, with the result that the material temperature increases and thermal degradation occurs. With a mixer of the type indicated in FIGURE 4, wherein the feeding speed is entirely independently controlled, the feed rate may be increased to the desired level by increasing the feed screw speed, while the required shear rate may be developed at the desired level and the product temperature will be maintained within acceptable limits. Similarly, in preparing wax polyethylene dispersions, temperature and mixing action must be rigidly controlled to obtain the dispersions as rapidly as possible and, of course, there is a day-to-day variation in the quality of the raw material used. With present equipment, speeds may be set in accordance with the quality of the particular raw material being processed and good results can be achieved. The equipment is further well suited to the pressure leaching and devolatilization of solid or viscous liquid materials which require that the materials be subjected to a high shear to present maximum freshly exposed surface to the leaching material or for devolatilization, as the case may be. With the present equipment the mixing environment may be completely controlled without the necessity for a special seal at the feed screw, inasmuch as the separately driven feed screw can function as a product seal without in any way affecting mixer or agitator action.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

I claim:

1. In a continuous mixer: tubular barrel means providing a material processing chamber; inlet means communicating with said chamber for admitting material thereto; outlet means communicating with said chamber at a spaced distance therefrom for discharging material from said chamber; mixing element means in said chamber between said inlet means and outlet means; mixing shaft means on which said mixing element means is disposed; material advancing shaft means upstream of said mixing element means having material advancing elements thereon for advancing material from said inlet means toward said mixing element means; and means mounting said mixing shaft means for orbital rotation with said advancing shaft means and for rotation simultaneously about its own axis.

2. The combination defined in claim 1 in which said material advancing shaft means is concentrically disposed in said chamber and said advancing elements comprise a worm thread.

3. The combination defined in claim 2 in which said mixing element means comprises a series of paddles in axially adjacent relation on said mixer shaft means and fixed eccentrically thereon and said mixing shaft is rotated about an axis eccentrically disposed relative to the axis of said advancing shaft means.

4. The combination defined in claim 3 in which the eccentricity of said paddles is equal to the eccentric mounting of said mixer shaft means with respect to said advancing shaft means and said paddles are angularly displaced from one another on said mixer shaft with respect to a datum line through the axis of said mixer shaft.

5. The combination defined in claim 1 in which means is provided for driving said mixing and advancing shafts at different speeds.

6. The combination defined in claim 5 in which means is provided for independently adjusting the speed of at least one of said shafts relative to the other.

7. The combination defined in claim 1 in which said mixing elements comprise a series of paddle elements in axially adjacent relation on said mixer shaft means; at least one of said paddle elements comprising axially spaced apart paddles connected by axially parallel rod means.

8. The combination defined in claim 1 in which said advancing shaft means is tubular and includes an inner sleeve with an eccentric bore for rotatably receiving said mixing shaft means.

9. The combination defined in claim 8 in which means is provided for independently driving said advancing shaft means, said inner sleeve, and said mixing shaft means.

10. The combination defined in claim 1 in which said barrel means has longitudinal grooves and said mixing element means forces said material into the grooves and shreds portions of the material off.

References Cited
UNITED STATES PATENTS

| | | | |
|---|---|---|---|
| 2,485,854 | 10/1949 | Zona | 259—9 |
| 3,023,455 | 3/1962 | Geier et al. | 259—9 X |
| 3,164,375 | 1/1965 | Frenkel | 259—9 X |

ROBERT W. JENKINS, *Primary Examiner.*